May 30, 1967 J. S. SMITH 3,322,229
SIGNAL TRANSMISSION SYSTEM FOR WELL LOGGING
MAINTAINING AMPLITUDE INFORMATION
Filed Sept. 1, 1964 2 Sheets-Sheet 2

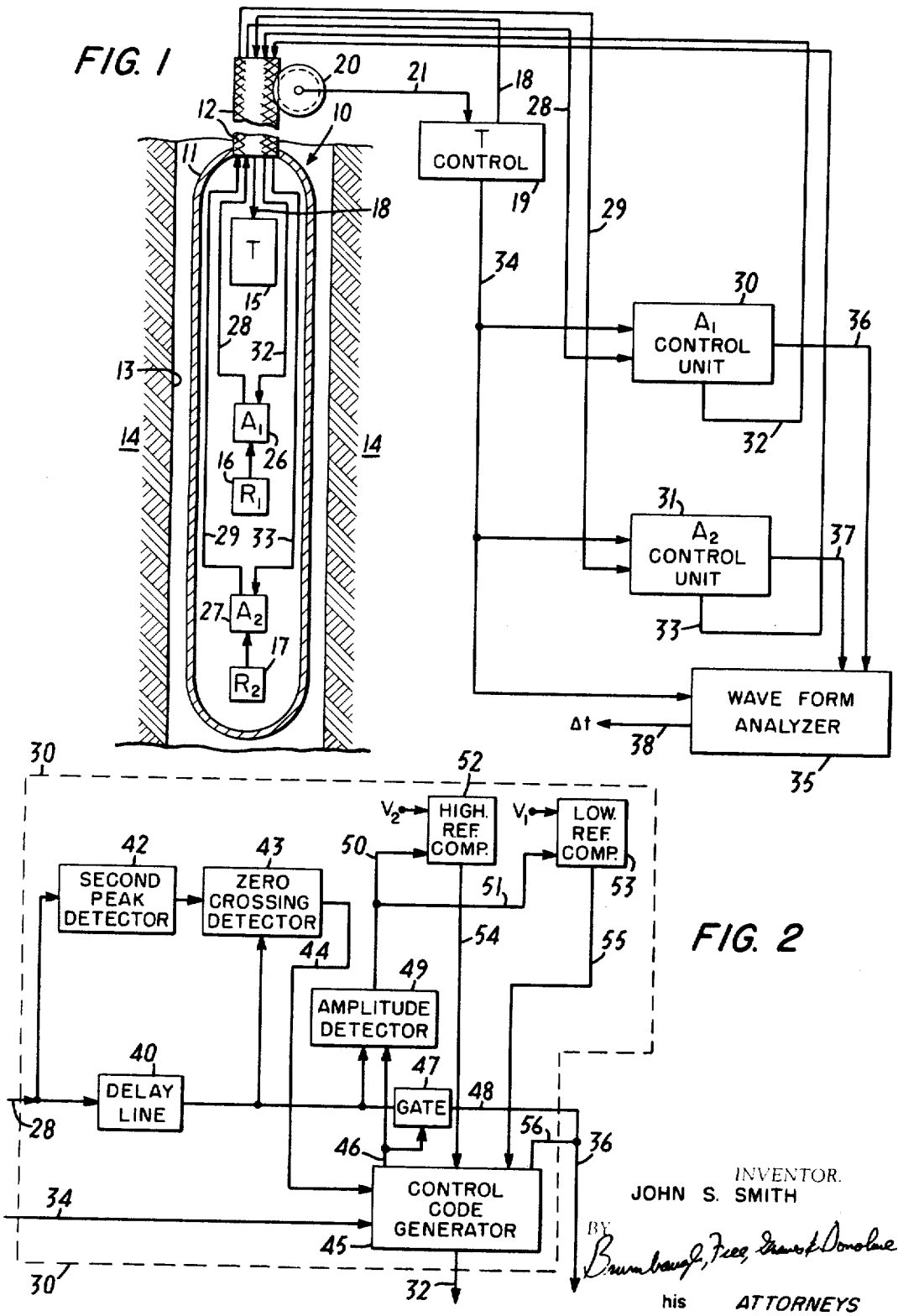

INVENTOR.
JOHN S. SMITH
BY
Brumbaugh, Free, Graves & Donohue
his ATTORNEYS

United States Patent Office 3,322,229
Patented May 30, 1967

3,322,229
SIGNAL TRANSMISSION SYSTEM FOR WELL LOGGING MAINTAINING AMPLITUDE INFORMATION
John S. Smith, Ridgefield, Conn., assignor, by mesne assignments, to Schlumberger Technology Corporation, Houston, Tex., a corporation of Texas
Filed Sept. 1, 1964, Ser. No. 393,514
12 Claims. (Cl. 181—.5)

This invention relates to systems for handling sonic signals and, more particularly, to a new and improved sonic signal transmission system wherein the dynamic range of sonic signals is compressed without distortion of the signal wave form.

In sonic logging systems for determining the characteristics of earth formation materials surrounding a well bore, for example, a sonic wave is generated by a wave generator and transmitted through the formation material to one or more sonic receivers and the signals generated by the receivers, upon reception of the sonic waves, are analyzed to determine the velocity of the wave in the formation material. Systems of this type are described in detail in the copending application Serial No. 841,396 of Robert B. Blizard, filed September 21, 1959, now Patent No. 3,237,153, for "Detection of Acoustic Signals" and assigned to the same assignee as the present application.

As described in the Blizard application, it is important that the wave form produced in a receiver by reception of a sonic wave be carefully preserved for analysis. In many instances, the required analysis of the sonic signal wave form is carried out within an instrument which is lowered into the well bore and which contains the sonic wave generator and one or more receivers but, to simplify the instrument structure, it is preferable to transmit the received sonic signals to apparatus at the surface of the earth for analysis. Inasmuch as the dynamic range of the sonic signals produced by a receiver may approach 100 db. or more, transmission of the signals to the surface of the earth without compression of their dynamic range would require complex circuitry for the transmission system, whereas compression in a conventional manner could result in distortion of the signal wave form.

Accordingly, it is an object of the present invention to provide a new and improved sonic signal compression system which overcomes the above-mentioned disadvantages of the prior art.

Another object of the invention is to provide a new and improved sonic signal compression system wherein wave form distortion is effectively avoided.

A further object of the invention is to provide a sonic signal compression system whereby the original dynamic range of the sonic signals may be restored, if desired.

These and other objects of the invention are attained by providing an amplitude level detector responsive to the amplitude of a portion of a sonic signal which is generated upon receipt of a sonic wave and a selective attenuator responsive to the amplitude level detector to attenuate the sonic signal to a degree necessary to reduce the amplitude level to a selected value. Preferably, the system includes a componet for recording or indicating the extent of the attenuation and, if desired, the original dynamic range of the sonic signals may be restored by providing an amplification which is dependent upon the extent of attenuation of the original signals.

Further objects and advantages of the invention will be apparent from a reading of the following description in conjunction with the accompanying drawings, in which:

FIG. 1 is a schematic block diagram illustrating a typical sonic signal compression system in accordance with the invention;

FIG. 2 is a schematic diagram illustrating the arrangement of a typical selective signal attenuator unit according to the invention;

Figure 3:
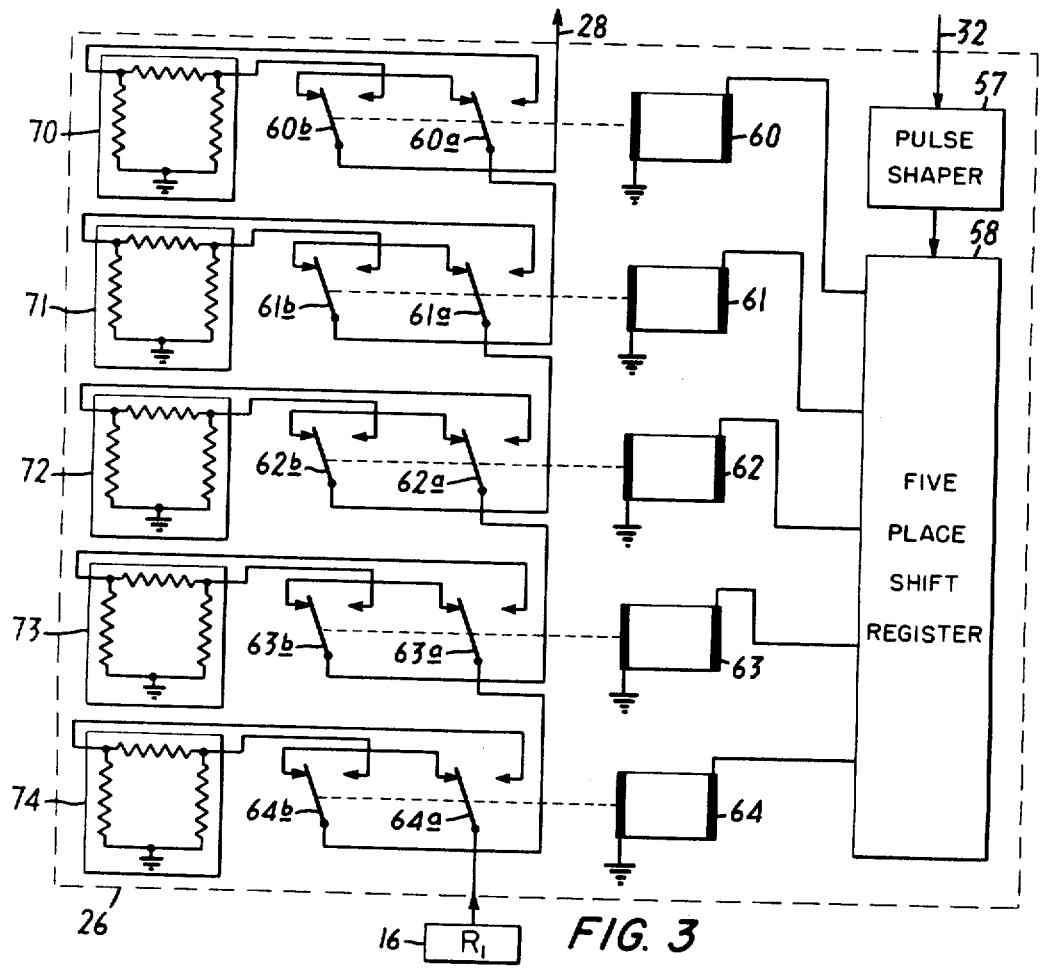
FIG. 3 is a schematic diagram illustrating a typical attenuator control unit arranged according to the invention.

In the representative sonic signal compression system illustrated in FIG. 1, a sonic well logging instrument 10 includes a housing 11, supported by a cable 12, and lowered into a well bore 13 by a conventional winch (not shown) to determine the characteristics of the surrounding earth formation 14. Within the housing 10, the instrument includes a sonic wave transmitter 15 and two sonic wave receives 16 and 17 which are spaced longitudinally at different distances from the transmitter 15. Both the transmitter 15 and the receivers 16 and 17 may be of any conventional type as, for example, a magnetostrictive bar surrounded by an energizing or a detecting coil. The sonic wave transmitter 15, moreover, is actuated through a cable conductor or channel 18 by a transmitter control unit 19 at the surface of the earth at a rate dependent upon the rate of motion of the instrument 10 through the bore 11. For this purpose, a wheel 20 engages the cable 12 to detect the rate of motion of the instrument and supplies a corresponding signal through a conductor 21 to the control unit 19 which provides, for example, four sonic wave transmissions per foot of motion of the instrument 10 in the well bore.

Figure 4:
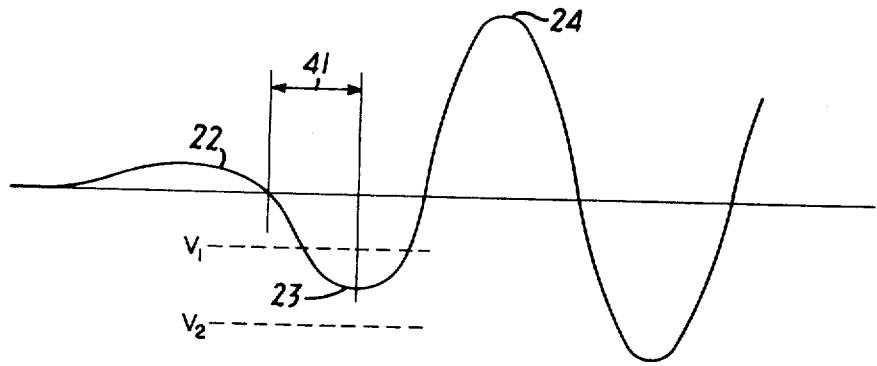
FIG. 4 is a graphical representation of the wave form of a typical sonic signal.

The wave form of a typical sonic signal generated by the receiver 16 or 17, upon receipt of a sonic wave, is illustrated in FIG. 4 wherein it will be noted that the first peak 22 has approximately one-third the amplitude of the second peak 23 and the third peak 24 has an amplitude about ten times that of the first peak. The following peaks which, for convenience, are not illustrated in FIG. 4, have successively decreasing amplitudes. Also, the exact times of arrival of the third and subsequent peaks at the receivers 15 and 16 are relatively more affected by interference between the direct wave and waves which have been reflected or have traveled by different paths. Consequently, it is desirable to refer all amplitude information in each wave to the level of the first or the second peak. Furthermore, the absolute value of the first and second peak amplitudes 22 and 23, along with the subsequent peaks in the same wave, can vary over an extremely wide range depending upon transmission conditions which may approach 100 db., for example.

According to the present invention, therefore, the sonic signals produced by the receivers 16 and 17 are passed through corresponding selective attenuator units 26 and 27 wherein their dynamic range is reduced to a much smaller value such as 3 db. for transmission to analyzing apparatus at the surface of the earth through corresponding cable conductors or channels 28 and 29. (It will be understood that the sonic signals may be transmitted either over separate conductors of a multiconductor cable or through separate channels of a multiplex transmission system utilizing a single conductor for transmission of several channels.) Furthermore, the arrangement of the selective attenuator units 26 and 27 will be described in detail hereinafter with reference to FIG. 3. With the dynamic range reduced to about 3 db., the design of the necessary amplifiers and any multiplexing circuits is greatly simplified and the cross-talk problem in multichannel systems is also reduced.

In order to control the selective attenuator units 26 and 27 so as to introduce the proper amount of signal attenuation, the signals from the channels 28 and 29 are applied to corresponding attenuator control units 30 and 31 wherein the amplitude level of each sonic signal is measured to determine whether greater or less attenuation is required to maintain the desired dynamic range of 3 db. A typical attenuator control unit ararngement is described hereinafter with respect to FIG. 2. Based upon the amplitude level determination made in the attenuator control unit, a control signal is transmitted from each attenuator control unit 30 and 31 through corresponding conductors 32 and 33 to the attenuator units 26 and 27, respectively, and to synchronize the control signal application with the inactive portion of the transmitter and receiver operation cycles, a reference signal is applied from the transmitter control unit 19 to the attenuator control units 30 and 31 through a conductor 34.

After selection of the amplitude information, the sonic signals are transmitted from the attenuator control units 30 and 31, along with a signal representing the extent to which the sonic signal was attenuated, to a wave form analyzer unit 35 by two cables 36 and 37, respectively. In the analyzer unit 35, the two sonic signals from the cables 36 and 37 are analyzed and compared according to any of the methods described in the above-mentioned Blizard application or any conventional method to determine, for example, the transit time $\Delta t$ of the sonic wave between the two receivers 16 and 17 and to provide a corresponding signal at an output 38. If it is desired to restore the sonic signals to their original dynamic range, the analyzer unit 35 may also include appropriate variable or selective gain amplifier circuits wherein the gain is controlled or selected in response to the signals representing the extent of attenuation of the sonic signals so as to recreate the original dynamic range of those signals without distortion of the sonic signal wave form.

In a representative attenuator control unit 30, illustrated in detail in FIG. 2, the sonic signal received from the receiver 16 and the attenuator unit 26 by way of the conductor 28 is first applied to a circuit adapted to pass sonic signals and reject extraneous signals resulting from noise, for example. A typical sonic signal detector shown in the circuit of FIG. 2 comprises a conventional delay line 40 arranged to introduce a delay in the transmission of the signal from the line 28, which is equivalent to the normal delay between the time the sonic signal voltage is zero after the first peak 22 and the time of occurrence of the second peak 23 as represented by the line 41 in FIG. 4.

The input signal from the line 28 is also applied to a second peak detector 42, which may be a circuit of any well-known type adapted to produce a pulse output at the time the sonic wave form produces the second peak 23 of FIG. 4. Finally, a zero crossing detector 43 of any well-known type receives the pulse from the second peak detector 42, and, at the same time, responds to the initial crossing of the zero potential level between the positive peak 22 and the negative peak 23, thereby indicating that a sonic signal rather than a noise signal has arrived. Upon the simultaneous receipt of a pulse and detection of the zero crossing in this manner, the detector 43 transmits an output signal on a line 44 to initiate operation of a control code generator 45.

In response to the initiating signal from the line 44, the control code generator 45 transmits a signal by a conductor 46 which opens a gate 47 permitting the sonic signal to pass by way of a conductor 48 in the cable 36 to the wave form analyzer. In addition, the signal on the conductor 46 also actuates an amplitude detector 49 which determines the magnitude of the second voltage peak 23 as it is received and this may be done in any conventional way as, for example, by charging a capacitor. Thereafter, a signal representing the magnitude of the peak 23 is transmitted by two conductors 50 and 51 to a high reference voltage comparator 52 and to a low reference voltage comparator 53, respectively, both of which may be of a conventional type.

In the high reference voltage comparator, the amplitude of the peak 23 is compared with a predetermined maximum voltage value $V_2$ which is represented by the similarly designated line in FIG. 4 and which corresponds to the second peak amplitude of a sonic signal having the highest desirable amplitude for transmission from the instrument 10 to the analyzing apparatus at the surface of the earth. Accordingly, if the amplitude of the second peak 23 exceeds the value $V_2$, the comparator 52 applies a signal through a line 54 to the control code generator indicating that increased attenuation of the sonic signal is necessary to bring it within the desired amplitude range for transmission. Conversely, if the second peak amplitude 23 falls below the preselected minimum value $V_1$, the low reference comparator 53 supplies a signal through a line 55 to the control code generator 45 calling for reduced attenuation. If desired, the signals on the lines 54 and 55 may be indicative of the extent of the increase or decrease in attenuation which is necesary to bring the second peak amplitude within the desired range but, in most instances, the repetition rate of the transmitter 15 is great enough with respect to the rate of variation in the characteristics of the formation material so that a shift of only one step in the attenuator unit setting will be necessary at any one time and, consequently, the comparator signals need represent only the direction of the necessary adjustment and not the magnitude.

Moreover, if it is desired to use the amplitude of the first peak 22 to determine the necessary attenuation rather than that of the peak 23, a further delay line may be included following the delay line 40 so that the signal applied to the amplitude detector begins before the first peak 22 rather than at the zero crossing between the peaks 22 and 23. In this case, of course, the sign of the comparison voltages $V_1$ and $V_2$ should be reversed and their magnitude decreased by about two-thirds and appropriate changes should be made in the amplitude detector 49 to respond to positive rather than negative signals.

Based upon the information in the signals received on the line 54 or 55, the control code generator 45 modifies, as necessary, the previous setting of the attenuator 26 which has been retained in a memory unit within the code generator and then transmits a code signal representing the new attenuator setting to the attenuator unit by way of the conductor or channel 32 in the cable 12. To avoid any conflict with the operation of the sonic signal receiver 16, the transmission of the code signal is synchronized with the actuation cycle of the transmitter 15 by the reference signal received from the transmitter control unit 19 on the line 34. In this regard, it will be understood that the entire cycle of operation of the sonic wave generator 15 and the sonic receivers 16 and 17 and the analysis of the signals by the wave form analyzer 35 takes place in a very short time, usually less than one millisecond. Consequently, with a transmitter repetition rate of about twenty per second, for example, there are approximately forty-nine milliseconds of dead time between sonic wave detections during which the code signal may be sent to the attenuator unit 26 and any necessary adjustment thereof accomplished. The code signal is also transmitted to the wave form analyzer unit 35 by way of a conductor 56 in the cable 36 so as to indicate the actual magnitude of the next sonic signal which will be received. If the original dynamic range of the sonic signals is to be reproduced, the code signal is used in the wave form analyzer unit to control the gain of the previously mentioned variable or selective gain amplifier circuits.

Preferably, the attenuator control signal is in the form of a sequential binary code wherein each binary bit represents the presence or absence of a selected amount of attenuation. In the typical example described herein, the code is in the form of a five bit sequential code which is transmitted by way of the conductor 32 through a pulse shaper 57 and into a five place shift register 58 located within the attenuator unit 26 as shown in FIG. 3. One form of code which may be used for this purpose is a self-clocking split phase code. The shift register may be of any conventional type and is arranged to actuate and hold upon completion of receipt of the code signal a group of relays 60, 61, 62, 63 and 64 according to the bit information contained in the code signal. These relays are each provided with a pair of contacts designated in the drawings by the same reference numeral followed by the letters *a* and *b*, respectively. In the unenergized condition of the relays illustrated in the drawings, the normally closed points of all of the relay contacts are connected as shown in FIG. 3 to provide a continuous circuit from the receiver 16 to the output conductor 28 without including any attenuation. In response to energization of any of the relays 60–64, however, both of the corresponding contacts are transferred and one of a group of attenuators 70, 71, 72, 73 and 74 is inserted in series into the circuit of the attenuator unit between the receiver 16 and the output line 28.

Each of the attenuators 70–74 is preferably of the constant impedance type consisting, for example, of a pi-type resistance network as shown in FIG. 3. Moreover, the attenuation values provided by the attenuators in the group 70–74 are arranged so that the minimum possible attenuation steps can be provided for in maximum total attenuation. As an example, the attenuators 70–74 may provide attenuations of 3 db., 6 db., 12 db., 24 db., and 48 db., respectively, so that a total attenuation of 93 db. is produced by inclusion of all of the attenuators and lower attenuations may be provided in 3 db. steps by selective actuation of the attenuator relays 60–64.

In operation, a sonic wave generated at the transmitter 15 in response to a signal from the control unit 19 actuates the receivers 16 and 17 and the signals produced in the receivers, after passing through the attenuator units 26 and 27, respectively, are transmitted to the surface of the earth by the conductors 28 and 29. As these sonic signals are applied to the attenuator control units, they are distinguished from noise signals by the components 40, 42 and 43 and the gate 47 is opened, permitting the signal to pass to the wave form analyzer 35. At the same time, the amplitude of the second peak 23 is detected and is compared with the high and low voltage references $V_1$ and $V_2$ by the comparators 53 and 52, respectively. Any amplitude falling outside the range defined by $V_1$ and $V_2$ causes the control code generator to produce a new code signal calling for a change in attenuation of the sonic signal. Upon receipt of a synchronizing signal from the transmitter control unit 19, the control code generator transmits the new code signal to the attenuator unit 26 and, at the same time, sends the signal to the wave form analyzer 35 representing the new code. In the attenuator unit 26, the shift register 58, upon receipt of the code, actuates the corresponding relays in the group 60–64 so that the appropriate attenuators in the group 70–74 are introduced in series into the transmission line.

Although the invention has been described herein with reference to a specific embodiment, many modifications and variations therein will readily occur to those skilled in the art. For example, if it is desired to provide greater sonic signal compression for the surface equipment than is necessary for transmission through the cable 12, the compression can be accomplished in two stages, a first attenuator being included in the down-hole instrument as illustrated and previously described, and a second attenuator stage being included in the apparatus at the surface of the earth. Accordingly, all such variations and modifications are included within the scope of the invention as defined by the following claims.

I claim:

1. In a sonic logging system including an instrument adapted to be lowered into a well bore to determine the characteristics of the surrounding earth formations, a sonic wave transmitter and a sonic wave receiver within the instrument, sonic signal analyzing apparatus at the surface of the earth, and electrical cable means connecting the instrument to the apparatus at the surface of the earth, the improvement comprising variable attenuator means within the instrument for attenuating sonic signals from the receiver in accordance with a control signal before transmission of the sonic signals through the cable means and adapted to provide output signals having amplitude proportional to the input signals, attenuator control means responsive to variations in an amplitude level of sonic signals for generating a control signal, and means for applying the control signal to the variable attenuator means to attenuate the sonic signals in accordance therewith.

2. In a sonic logging system including an instrument adapted to be lowered into a well bore to determine the characteristics of the surrounding earth formations, a sonic wave transmitter and a sonic wave receiver within the instrument, sonic signal analyzing apparatus at the surface of the earth and electrical cable means connecting the instrument to the apparatus at the surface of the earth, the improvement comprising variable attenuator means within the instrument for attenuating sonic signals from the receiver in accordance with a control signal before transmission of the sonic signals through the cable means and adapted to provide output signals having amplitude proportional to the input signals, attenuator control means at the surface of the earth responsive to variations in an amplitude level of the attenuated sonic signals for generating a control signal, means for applying the control signal through the cable means to the variable attenuator means within the instrument, and means for applying the control signal to the sonic signal analyzing apparatus to indicate the extent of attenuation of the signals received thereby.

3. In a well logging system including an instrument adapted to be lowered into a well bore to determine a characteristic of the well bore environment, a device providing information signals of variable amplitude in accordance with the characteristic and cable means for transmitting signals from the instrument to the surface of the earth, the improvement comprising variable attenuator means within the instrument for receiving the information signals from the device before transmission through the cable means and providing corresponding output signals having amplitude proportional to the received signal amplitude, amplitude detector means at the surface of the earth responsive to variations in amplitude of the characteristic signals and control signal generating means at the surface of the earth for producing a control signal in accordance with the response of the detector means and applying the control signal through the cable means to the variable attenuator means.

4. In a well logging system including an instrument adapted to be lowered into a well bore to determine a characteristic of the well bore environment, a device providing information signals of variable amplitude in accordance with the characteristic and cable means for transmitting signals from the instrument to the surface of the earth, the improvement comprising variable attenuator means within the instrument for receiving information signals and attenuating the information signals in accordance with a binary code control signal to provide attenuated signals having amplitude proportional to the information signals, amplitude detector means responsive to variations in an amplitude level of the attenuated information signal, control signal generating means responsive to the amplitude detector means for producing a binary code signal representing a desired setting of the variable attenuator means and means for applying the binary code signal to the variable attenuator means.

5. In a well logging system including an instrument adapted to be lowered into a well bore to determine a characteristic of the well bore environment, a device providing information signals of variable amplitude in accordance with the characteristic and cable means for transmitting signals from the instrument to the surface of the earth, the improvement comprising variable attenuator means within the instrument for receiving the information signals and attenuating the information signals in accordance with a control signal to provide attenuated signals having amplitude proportional to the information signals, signal transmission means for applying the attenuated signals to the cable means, amplitude detector means at the surface of the earth responsive to variations in an amplitude level of the attenuated information signals, and control signal generating means at the surface of the earth for producing a control signal in accordance with the response of the detector means and for applying the control signal to the cable means for transmission to the variable attenuator means.

6. In a well logging system including an instrument adapted to be lowered into a well bore to determine a characteristic of the well bore environment, a device providing information signals of variable amplitude in accordance with the characteristic and cable means for transmitting signals from the instrument to the surface of the earth, the improvement comprising variable attenuator means within the instrument for receiving the information signals from the device before transmission through the cable means and adapted to provide any of a plurality of different attenuation levels in response to a control signal selecting a given attenuation level to produce output signals having amplitude proportional to the information signals, input means for applying information signals to the variable attenuator means, amplitude detector means at the surface of the earth responsive to variations in an amplitude level of the attenuated signals, and control signal generating means at the surface of the earth for producing a control signal adapted to select a given attenuation level of the variable attenuator means in accordance with the response of the detector means and applying the control signal through the cable means to the variable attenuator means.

7. A well logging system according to claim 6 wherein the variable attenuator means includes a plurality of constant impedance attenuators providing a progressive series of attenuation values having a constant ratio relationship.

8. A well logging system according to claim 7 including shift register means for receiving a sequential binary code control signal and selecting certain of the plurality of attenuators in accordance therewith, and wherein the control signal generating means includes means for generating a sequential binary code control signal.

9. In a well logging system including an instrument adapted to be lowered into a well bore to determine a characteristic of the well bore environment, a device providing information signals of variable amplitude in accordance with the characteristic and cable means for transmitting signals from the instrument to the surface of the earth, the improvement comprising variable attenuator means within the instrument for receiving the information signals and attenuating the information signals in accordance with a control signal to provide attenuated signals having amplitude proportional to the information signals, amplitude detector means responsive to variations in an amplitude level of the attenuated signal, information signal analyzer means at the surface of the earth for receiving and analyzing the attenuated information signals according to amplitude variations, and control signal generating means for producing a control signal in accordance with the response of the detector means and applying the control signal to the variable attenuator means and to the signal analyzer means.

10. In a well logging system including an instrument adapted to be lowered into a well bore to determine a characteristic of the well bore environment, a device providing information signals of variable amplitude in accordance with the characteristic, and cable means for transmitting signals from the instrument to the surface of the earth, the improvement comprising variable attenuator means within the instrument for receiving the information signals from the device before transmission through the cable means and adapted to provide any of a plurality of different attenuation levels so as to produce output signals having amplitude proportional to the information signals, control means within the instrument for selecting a given attenuation level in response to a control signal, and signal analyzer means at the surface of the earth for receiving signals from the attenuator means including amplitude detector means for detecting the amplitude of the received signal, comparing means for comparing the amplitude of the received signal with maximum and minimum reference values, and control signal generating means responsive to the comparing means for transmitting a control signal to the attenuator control means to cause the amplitude of signals received from the attenuator means to lie between the maximum and minimum reference values.

11. A well logging system according to claim 10 wherein the variable attenuator means includes a plurality of constant impedance attenuators providing a progressive series of attenuation values having a constant ratio relationship.

12. A well logging system according to claim 10 wherein the control means comprises shift register means for receiving a sequential binary code signal and selecting certain of the plurality of attenuators in accordance therewith, and wherein the control signal generating means includes means for generating a sequential binary code control signal.

References Cited

UNITED STATES PATENTS

| | | | |
|---|---|---|---|
| 3,012,195 | 12/1961 | Slocomb et al. | 324—99 |
| 3,050,150 | 8/1962 | Tixier | 340—18 X |
| 3,179,879 | 4/1965 | Tanguy | 324—6 |
| 3,181,056 | 4/1965 | Boissonnas | 340—18 |
| 3,187,301 | 6/1965 | Summers | 181—.5 X |
| 3,212,601 | 10/1965 | Summers | 181—.5 |

BENJAMIN A. BORCHELT, *Primary Examiner.*

W. KUJAWA, *Assistant Examiner.*